(12) United States Patent
Cuomo et al.

(10) Patent No.: US 6,523,170 B1
(45) Date of Patent: *Feb. 18, 2003

(54) TECHNIQUE FOR CREATING INTERNET ENABLED RESOURCE FILES

(75) Inventors: Gennaro A. Cuomo, Apex, NC (US); Richard J. Redpath, Cary, NC (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 869 days.

(21) Appl. No.: 08/692,856

(22) Filed: Jul. 26, 1996

(51) Int. Cl.$^7$ ................................................ G06F 9/45
(52) U.S. Cl. ...................................................... 717/136
(58) Field of Search ................................. 395/701–708, 395/702, 703, 705; 717/136

(56) References Cited

U.S. PATENT DOCUMENTS

| | | | | | |
|---|---|---|---|---|---|
| 5,428,792 A | * | 6/1995 | Conner et al. | ............... | 395/700 |
| 5,493,680 A | * | 2/1996 | Danforth | ..................... | 395/700 |
| 5,659,723 A | * | 8/1997 | Dimitrios et al. | ........... | 395/614 |
| 5,717,925 A | * | 2/1998 | Harper et al. | ................ | 707/102 |
| 5,784,583 A | * | 7/1998 | Redpath | ..................... | 395/353 |
| 5,828,885 A | * | 10/1998 | Raman | ........................ | 395/705 |

OTHER PUBLICATIONS

Gonsalves, Antone, Neuron design new IDE 'Architecture.', PC Week, v14, n37, p8(1), Sep. 1, 1997.*
Running Resource Wizard, Visual J++: Users Guide—MSDN Library, Dec. 1996.*
IBM, OS/2 2.0 Application Design Guide, QUE, Chapter 7, section Object Interface Definition Language, p. 7–12, Mar. 1992.*
Hoff, Arthur van, "Java and Internet Programming", Dr. Dobb's Journal, pp (10), Aug. 1995.*
Simonsen, Palle, "Decision Support in Java", EXE: The Software Developer's Magazine, pp(8), Jan. 1996.*
Kramer, Douglas, "The Java Platform—A White Paper", JavaSoft, Sun Microsystems, Inc., pp. 1–24, May 1996.*
Tannenbaum, Todd, "Brewing Fresh Code: Java Development Environments," Network Computing, n 803, PG96, Feb. 1997.*
Leach, Norvin; Baron, Talila, "Microsoft shows tool upgrades; hones VB's screen configuration, Java's code generator, Web kits,", PC Week, v13, n23, p100(1), Jun. 10, 1996.*
Munro, Jay, "Symantec Cafe pours Java without the jitters" PC Magazine, v15, n11, pp (4), Jun 11, 1996.*
(no author given) "Java Gets Down to Business: Critics say Java isn't ready for pime time. But others are using it to solve real–world business problems. What's their secret?" BYTE; vol. 22, No. 10, pp. (12), Oct. 1997.*
Tannenbaum, Todd, "Brewing Fresh Code: Java Development Environments" Network Computing, 1997, n 803, pp. (8), Feb. 15, 1997.*

* cited by examiner

Primary Examiner—St. John Courtenay, III
(74) Attorney, Agent, or Firm—Gregory M. Doudnikoff (57) ABSTRACT

A technique for converting a resource file into object oriented source code and/or an object oriented class. A standard resource file is first converted into source code for an object oriented language. The converter includes a subprocess relative to each keyword included in the resource file for converting the information associated with each keyword into a format includable in an object oriented class. Other elements of the resource file, such as the filename, are also converted as needed into the target language, and formal code required by classes in the target language is also created. The preferred target language is Java.

9 Claims, 10 Drawing Sheets

```
c:\tazza\tazza\Visual\my.jrc
─────Top of File─────
PACKAGENAME tazza.resource INCLUDE /tazza/tazza/Visual/my.pii IMAGE CANCEL      /tazza/tazza/resource/no.gif
IMAGE 100         /tazza/tazza/resource/images/cut.gif STRINGTABLE
    Product         IBM Copyright 1996 Tazza product
    File            STR_FILE
    100             STR_FILE
    View            STR_VIEW
    PackageFinder   STR_PACKAGEFINDER
ENDSTRINGTABLE MENU main
    SUBMENU 100       STR_FILE
        MENUITEM 101  STR_SAVE
        MENUITEM 102  STR_SAVEAS
    ENDSUBMENU
    SEPARATOR
    MENUITEM 200      Close
    MENUITEM 201      Close all
ENDMENU
```

| FIG. 6A |
|---|
| FIG. 6B |

FIG. 6A

```
c:\tazza\Visual\my.java
──── Top of File ────
package tazza.resource;
import java.lang.*;
import java.util.*;
import java.awt.*;
import tazza.jres;

public class my extends jres {
static private Hashtable indexing= new Hashtable<>;
public static String CANCEL=
"\107\111\106\70\71\141\100\0\100\0\242\377\0\300\300\300\377\347\347\377\275\275\
\114\327\101\230\6\324\0\355\55\344\117\57\135\355\310\306\103\236\103\134\16\303\
\61\335\231\220\76\74\372\104\150\12\343\345\370\135\177\34\23\152\10\233\242\126\
"",;
public static String ijres100=
"\107\111\106\70\67\141\31\0\31\0\304\0\0\377\377\377\377\0\377\333\0\377\266\
"\267\270\43\41\0\73" +
"",;
public static String Product="IBM Copyright 1996 Tazza product";
public static String File="File";
public static String sjres100="File";
public static String View="View";
public static String PackageFinder="STR_PACKAGEFINDER";
public static String main="MENU:"
```

80

84

94

```
+" <100 File\n"
+",101 STR_SAVE\n"
+",102 STR_SAVEAS\n"
+" >\n"
+" -\n"
+",200 Close\n"
+",201 Close all\n"
;

public static Menu LoadMenu<int id> {
    String baseName= new String<"mjres">;
    return LoadMenu<<String>indexing.get<baseName.concat<String.valueOf<id>>>>;
} public static String LoadString<int id> {
    String baseName= new String<"sjres">;
    return <<String>indexing.get<baseName.concat<String.valueOf<id>>>>;
} public static Image LoadImage<int id> {
    String baseName= new String<"ijres">;
    return LoadImage<<String>indexing.get<baseName.concat<String.valueOf<id>>>>;
} static private my jresdata= new my<>;
public my<> {
    indexing.put<ijres100",ijres100>;
    indexing.put<sjres100",sjres100>;
}
```

TECHNIQUE FOR CREATING INTERNET ENABLED RESOURCE FILES

BACKGROUND OF THE INVENTION

1. Field of the Invention

The present invention relates to a technique for creating resource files which may be readily utilized by Internet compatible software applications. More particularly, the present invention relates to a technique for converting resource files into object oriented classes which may be utilized by software applications which exploit the Internet.

2. Description of the Related Art

Computer programs include logic and data portions. One type of data is known as resources. Resources include icons, cursors, menus, dialog boxes, audio clips, animation clips, film clips, etc. Thus, in today's graphical and multimedia intensive programs, resources are vital portions of programs.

However, resources do not reside in a programs normal data segment. Thus, resources and resource files, in which resources are typically contained, are treated separately and differently from other types of data. For example, when the Windows operating system loads programs into memory for execution, such as those written in the C or C++ programming languages, it usually leaves the resources on the disk. Windows is a trademark of Microsoft Corporation. Typically, only when the Windows operating system needs a particular resource during execution of the program does it load the resource into memory.

Some object oriented languages treat resource files somewhat differently. For example, Smalltalk and ScriptX turn resources that will be utilized by an application or program into data objects, but then place these data objects into an object pool or resource pool for use by the application as necessary. Thus, resource data objects have still not obtained the status of a "class", and are and must be treated differently than regular object oriented classes in both Smalltalk and ScriptX.

This state of the art presents particular problems for applications that are to be used in conjunction with the Internet. The Java programming language is an object oriented language which has been optimized for the Internet. Java is a trademark of Sun Microsystems, Inc. Java classes may be easily used over the Internet, with security being provided relative to the classes as they are used via the Internet. Additionally, Java classes are packaged such that they may be compressed for sending over the Internet. This speeds up the transfer of data and enhances performance. However, resource data utilized by Java programs are still maintained in the same resource file format as utilized by languages such as C and C++. Accordingly, the security checking and compression techniques which are advantageous for Java classes are not applicable to resource files as utilized by Java programs per the present state of the art.

In order to appropriately support resource files, programming languages must have built-in thereto an appropriate support structure. The resource files support structure enables an application to access the data from the resource file during execution of the application at run-time. Obviously, if the need to rely on separate resource files were to be eliminated, a number of advantages would occur. First, it would not be necessary to build the necessary support structure for resource files into the programming language. Thus, special techniques for dealing with resource files would not have to be learned by developers or included in the program development environment. Additionally, with respect to Java, elimination of separate resource files and the inclusion of that information in Java language programs themselves as classes would enhance the security of the overall system, as the classes would be checked by the Java security implementation, and permit the resource files to be seamlessly compressed in accordance with accepted techniques for Java classes.

Accordingly, a need exists for a technique for permitting enhanced handling of data usually maintained in resource files while reducing complexity.

SUMMARY OF THE INVENTION

An object of the present invention is to provide a technique for converting resource files into object oriented classes.

Another object of the invention is to convert and compile resource files into Java source code and classes in order to gain the advantages available for manipulating Java classes in relation to the Internet.

Yet another object of the invention is to provide a technique for eliminating special support structures required in programming languages to deal with resource files at run-time.

Other objects and advantages of the present invention will be set forth in part in the description and the drawings which follow, and, in part, will be obvious from the description or may be learned by practice of the invention.

To achieve the forgoing object, and in accordance with the purpose of the invention as broadly described herein, the present invention provides computer readable code on media for converting a resource file into object oriented source code for a target object oriented language, comprising first subprocesses for converting a resource file filename to a class name acceptable by the target object oriented language; second subprocesses for converting information associated with each keyword into a format utilizable by a class in the target object oriented language; and third subprocesses for providing additional formatting code necessary for a class in the target object oriented language. The computer readable code may further comprise a compiler for compiling output of the first, second, and third subprocesses and it is preferred that the target object oriented language is Java.

The present invention also provides computer readable code for converting a resource file into source code for a target object oriented language class, comprising a plurality of subprocesses, one for each different keyword included the resource file, for converting data associated with the keyword into a form usable by a class in the target object oriented language; a first process for converting a resource filename into an acceptable class name; a second process for converting data associated with each keyword into code usable by the target object oriented language utilizing the subprocess corresponding to each keyword for each keyword in the resource file; and a third process for writing formal code required for a class in the target object oriented language.

Preferably, the target object oriented language is Java and the formal code written by the third process includes Java epilogue code and Java constructor code. The computer readable code may further comprise a fourth process for compiling output of the first, second and third processes into a Java class.

The present invention will now be described with reference to the following drawings, in which like reference numbers denote the same element throughout.

DESCRIPTION OF THE PREFERRED EMBODIMENT

Figure 1:
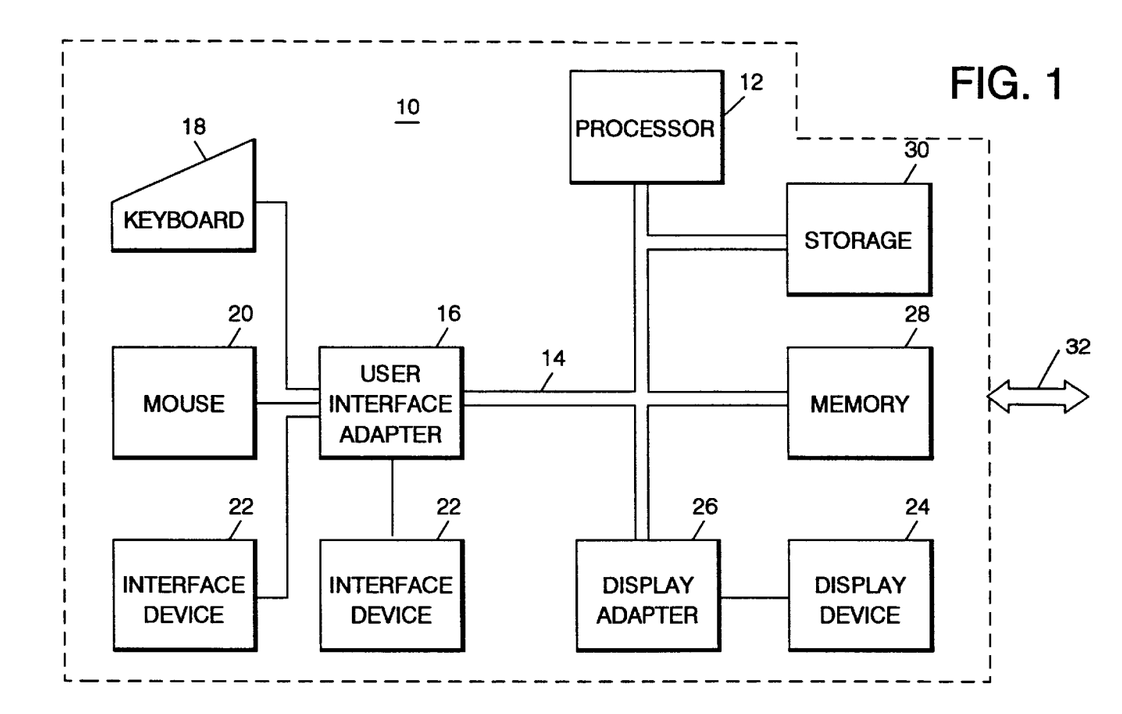
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adaptor 26. The bus 14 also connects the microprocessor 12 to memory 28 and permanent storage 30 which can include a hard drive, tape drive, etc.

The workstation 10 communicates via a communications channel 32 with other computers or networks of computers. The workstation 10 may be associated with such other computers in a local area network (LAN) or a wide area network, or the workstation 10 can be client in a client/server arrangement with another computer, etc. All of these configurations, as well as the appropriate communications hardware and software, are known in the art.

Figure 2:
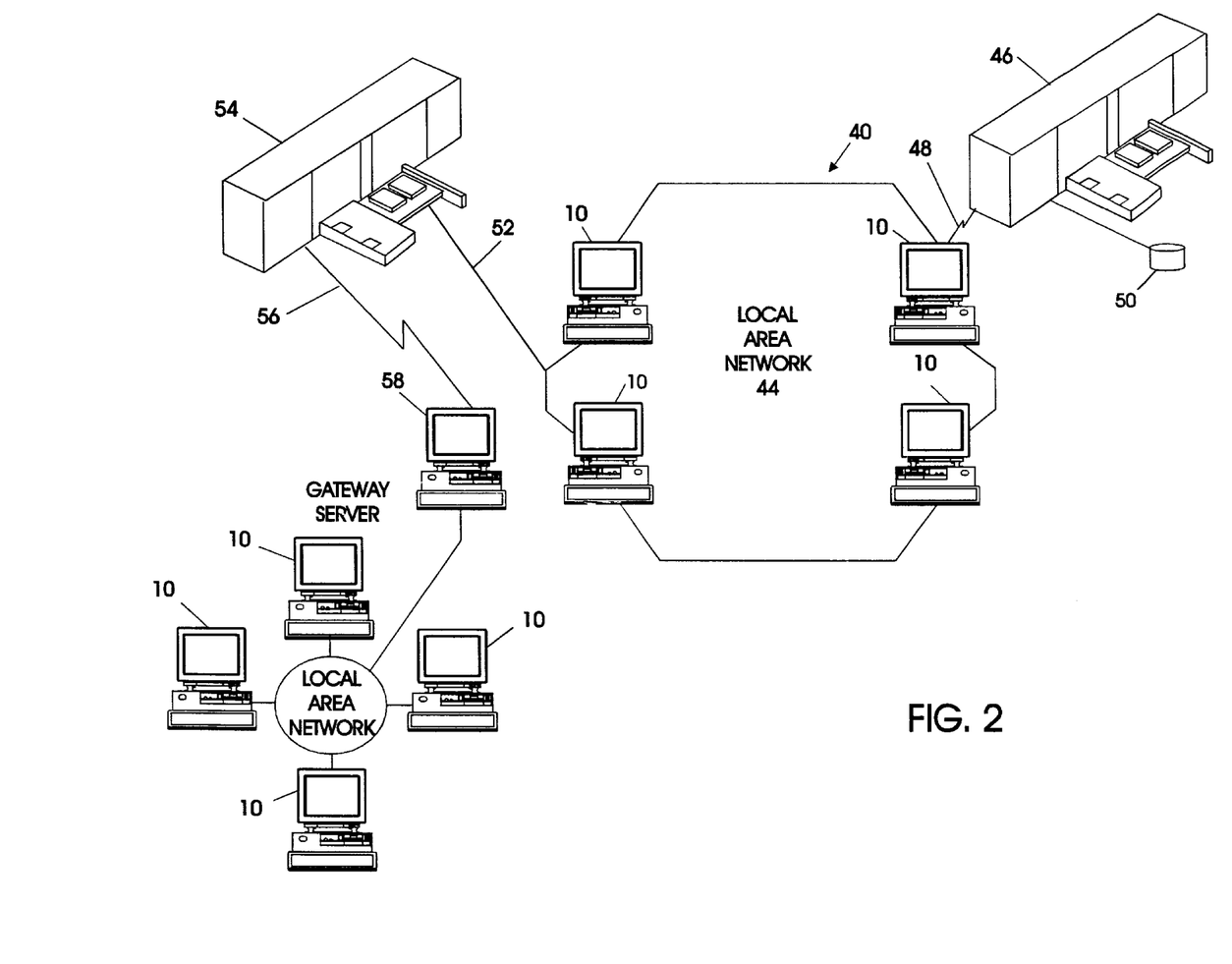
FIG. 2 is a diagram of a networked computing environment in which the present invention may be practiced.

FIG. 2 illustrates a data processing network 40 in which the present invention may be practiced. The data processing network 40 includes a plurality of individual networks, including LANs 42 and 44, each of which includes a plurality of individual workstations 10. Alternatively, as those skilled in the art will appreciate, a LAN may comprise a plurality of intelligent workstations coupled to a host processor.

Still referring to FIG. 2, the data processing network 40 may also include multiple mainframe computers, such as a mainframe computer 46, which may be preferably coupled to the LAN 44 by means of a communications link 48. The mainframe computer 46 may be implemented utilizing an Enterprise Systems Architecture/370, or an Enterprise Systems Architecture/390 computer available from the International Business Machines Corporation (IBM). Depending on the application, a midrange computer, such as an Application System/400 (also known as an AS/400) may be employed. "Enterprise Systems Architecture/370" and "Enterprise Systems Architecture/390" are trademarks of IBM; "Applications System/400" and "AS/400" are registered trademarks of IBM.

The mainframe computer 46 may also be coupled to a storage device 50, which may serve as remote storage for the LAN 44. Similarly, the LAN 44 may be coupled to a communications link 52 through a subsystem control unit/ communication controller 54 and a communications link 56 to a gateway server 58. The gateway server 58 is preferably an individual computer or intelligent workstation which serves to link the LAN 42 to the LAN 44.

Those skilled in the art will appreciate that the mainframe computer 46 may be located a great geographic distance from the LAN 44, and similarly, the LAN 44 may be located a substantial distance from the LAN 42. For example, the LAN 42 may be located in California, while the LAN 44 may be located in Texas, and the mainframe computer 46 may be located in New York.

Software programming code which embodies the present invention is typically stored in permanent storage of some type, such as the permanent storage 30 of the workstation 10. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

The preferred embodiment of the present invention will now be discussed with reference to FIGS. 3 through 8.

In the preferred embodiment, the present invention is implemented in the Java language. Object oriented languages, such as Java, Smalltalk and C++, typically include class libraries for use by developers when programming (developing applications) in the language. Class libraries are reusable sets of classes which typically provide relatively high level functionality. A class is one of the basic building blocks of object oriented languages, and comprises code which represents a combination of function and data. A developer creates an application by adding classes from a class library to the software application being created. A copy or instance of a class is included in the application being created.

A developer may manipulate classes in a predetermined number of ways, depending on the features of the individual language. For example, most object oriented classes have a number of basic characteristics, including encapsulation, polymorphism, and inheritance. Through polymorphism, a software component or class may make a request of another instance of the class without knowing exactly what that component or object is. The object or component which receives the request interprets the request and determines, in accordance with its internal data and functions, how to execute the request. The concept of inheritance permits easy modification of a class. A developer can write a subclass which inherits behavior from all of its parent classes.

All of these properties of object oriented programming, as well as related object orienting programming techniques, are well known to those skilled in the art, and will not be discussed in depth herein. While the present invention will be described in terms of a technique for converting a resource file into a Java class, the present invention may be utilized by a skilled programmer for converting a resource file into a class for other object oriented languages.

Figure 3:
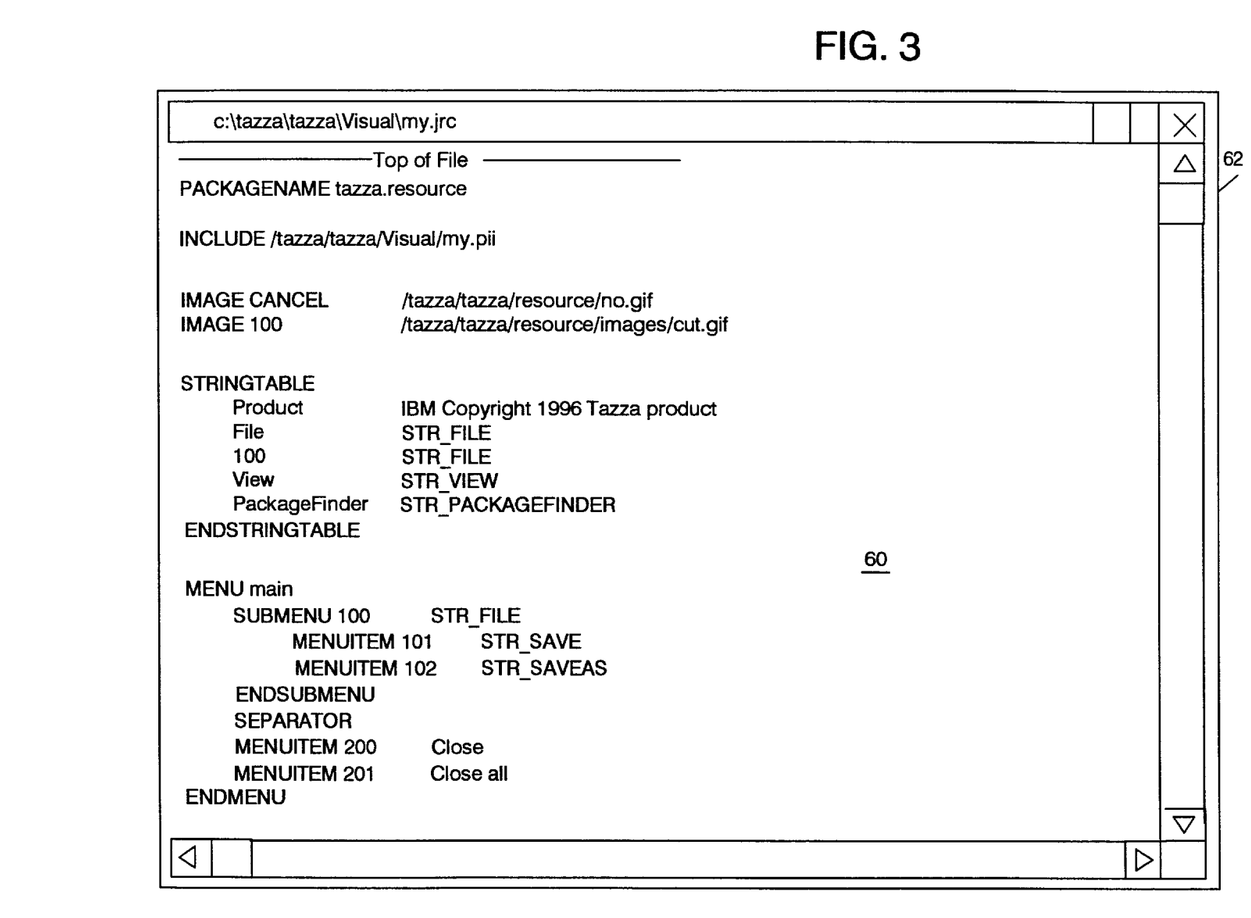
FIG. 3 illustrates a standard resource file displayed in a window.

A standard resource file 60 for use with an application which runs on the Windows or OS/2 operating systems is illustrated within a window 62 of FIG. 3. "OS/2" is a registered trademark of IBM. This particular resource file provides data which an application would typically call at run-time to produce graphical menus within a graphical user interface (GUI). Alternatively, a resource file could include a digital representation of a bit map, sound clip, animation clip, etc. The present invention provides a resource file code converter used in conjunction with a Java compiler for converting a typical resource file, such as the resource file 60 in FIG. 3, into a Java class.

Figure 4:
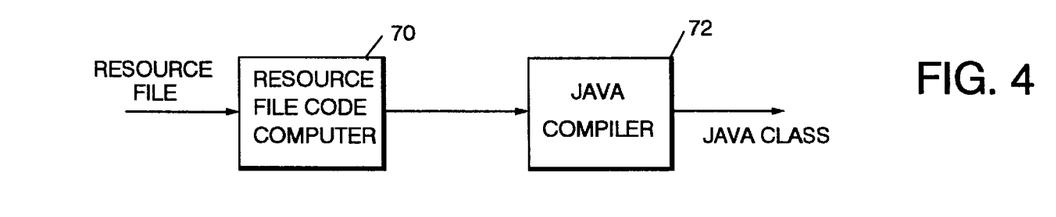
FIG. 4 illustrates the logical flow of data in the conversion process of the present invention.

As illustrated in FIG. 4, a resource file which is present in memory or storage is input into a resource file code converter 70, in which the resource file is converted into Java source code, which is output from the resource file code converter 70. The output Java source code is then input to a standard Java compiler 72, which compiles the Java source code into a Java class. The resource file code converter 70 and compiler 72 are also present within the memory of the data processing system, in accordance with known techniques. An individual resource file can be converted into a Java class at any time. For example, entire sets of resource files may be converted to produce a class library of Java classes which contain resource data, which may then be used by a developer when the developer is creating a Java application. Alternatively, a developer may use the invention while the developer is creating an application to convert individual resource files, as required, into Java classes for use in the application.

Figure 5A:
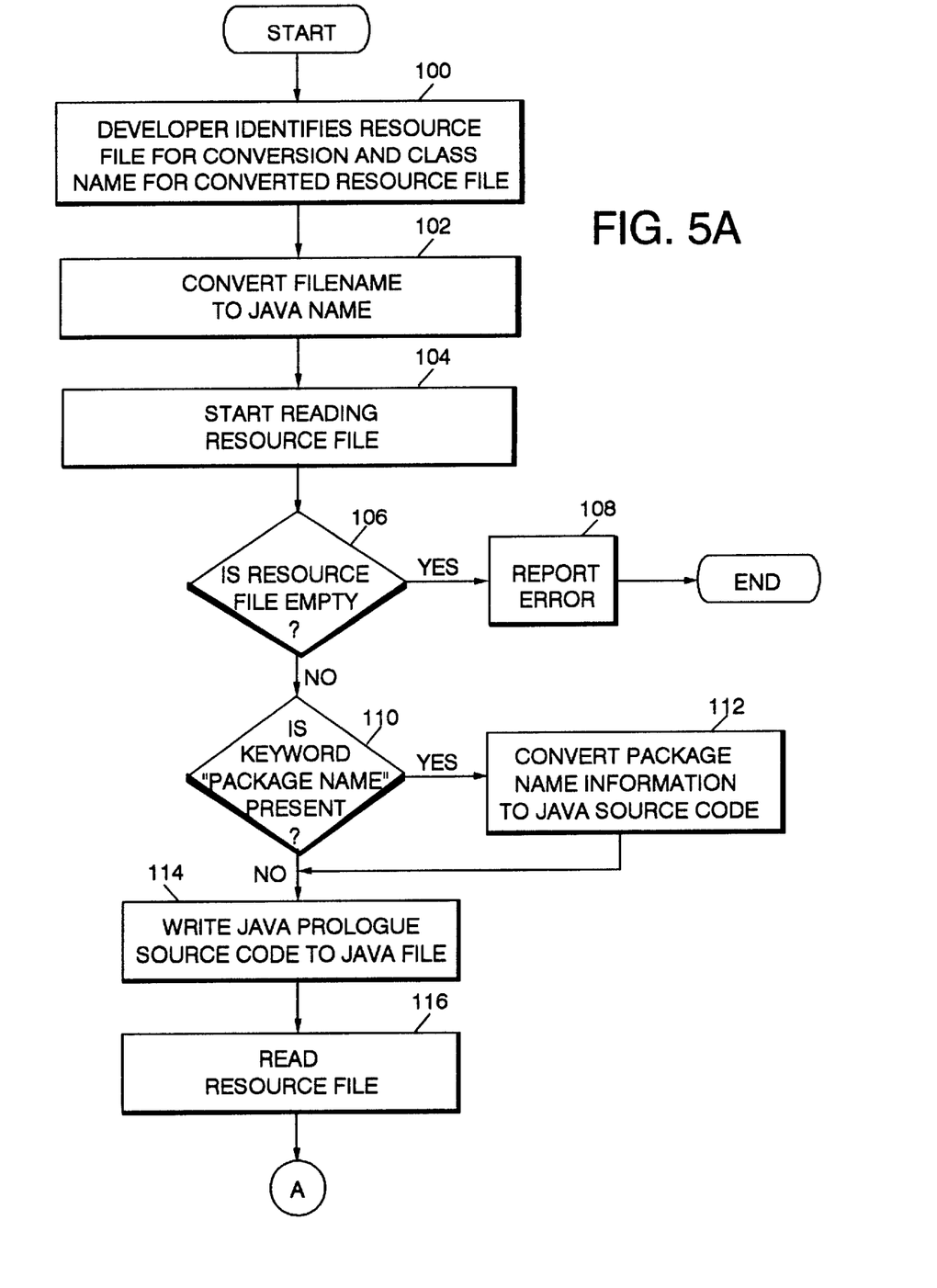
FIGS. 5A and 5B are flowcharts which set forth the logic involved with converting a standard resource file into a Java class.

The technique for converting a resource file into a Java class will now be discussed with reference to the flowchart of FIG. 5.

First, the developer identifies the resource file for processing by the resource file code converter 70 and provides a class name for the Java class that will be accepted by the Java compiler 72 (Step 100). The identified resource file and the name are then provided to the resource file code converter 70, and the resource file code converter 70 first converts the file name of the resource file into a Java language name (Step 102). Converting a file name so that it is readable and executable by a different language is a known process and details will not be discussed herein. This information, together with the rest of the information/Java language source code converted, written or created by the resource file code converter 70 is output to a temporary file in memory or cached until the entire resource file is converted, in accordance with known techniques.

Next, the resource file code converter 70 starts reading the body of the resource file (Step 104). First, it is determined whether any information is contained in the resource file (Step 106). If the resource file is found to be empty, this is an indication that something is amiss, and an error is reported to the developer, such as through a message displayed on the developer's monitor (Step 108), and the conversion process ends. In normal situations in which the resource file does contain data, the resource file code converter 70 first searches for the keyword "PackageName" within the resource file (Step 110). Packages are the mechanism by which classes in Java are organized; keywords are the mechanisms used by resource files to denote a specific type of resource data. Accordingly, it is preferable to associate the Java class which will result by the processing of the present invention with a specific package such that it is easier to find and utilize.

Figures 6, 6A:
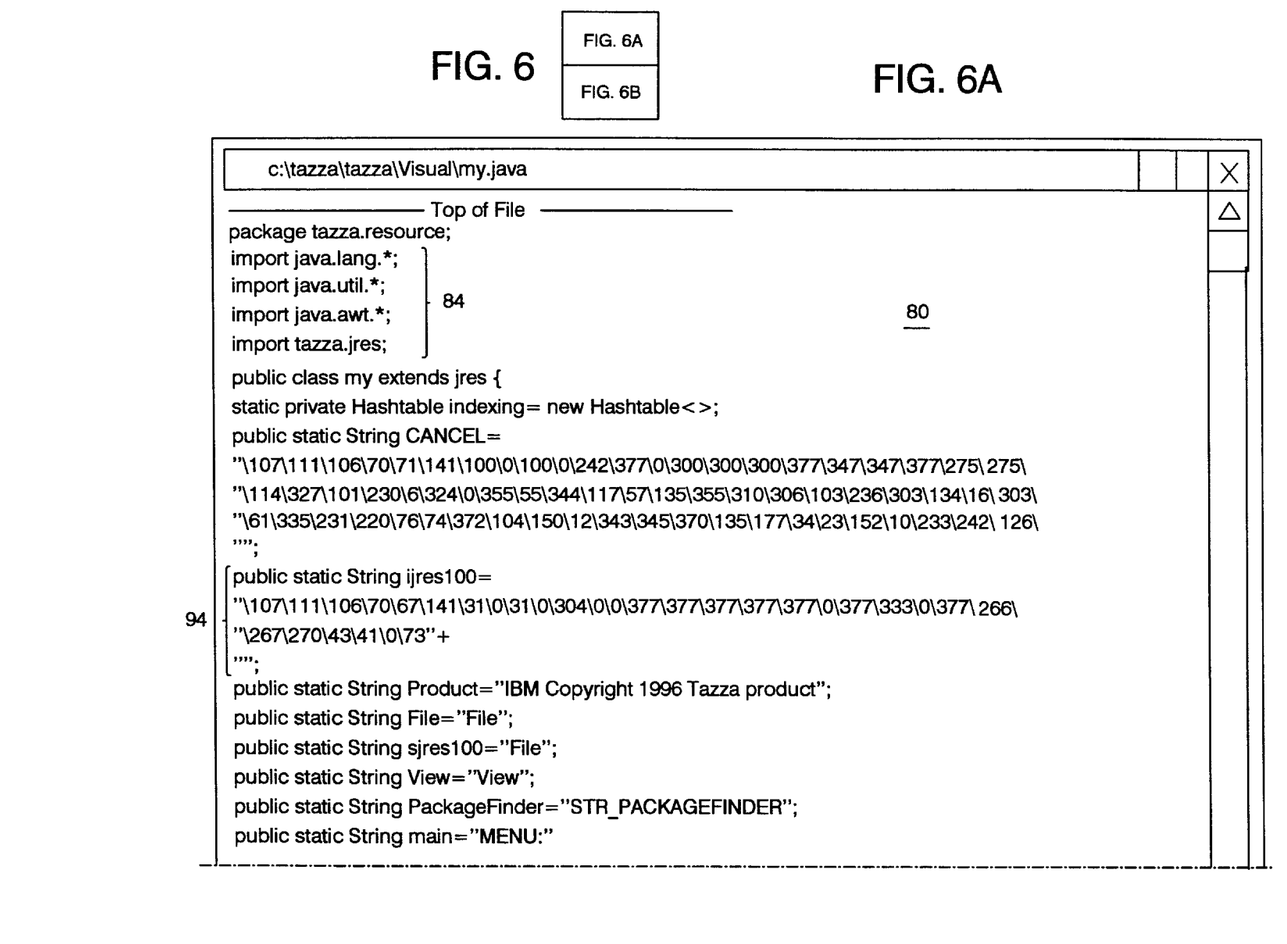
FIGS. 6A and 6B illustrate a converted resource file in Java source code form displayed in a window.
Figure 6B:
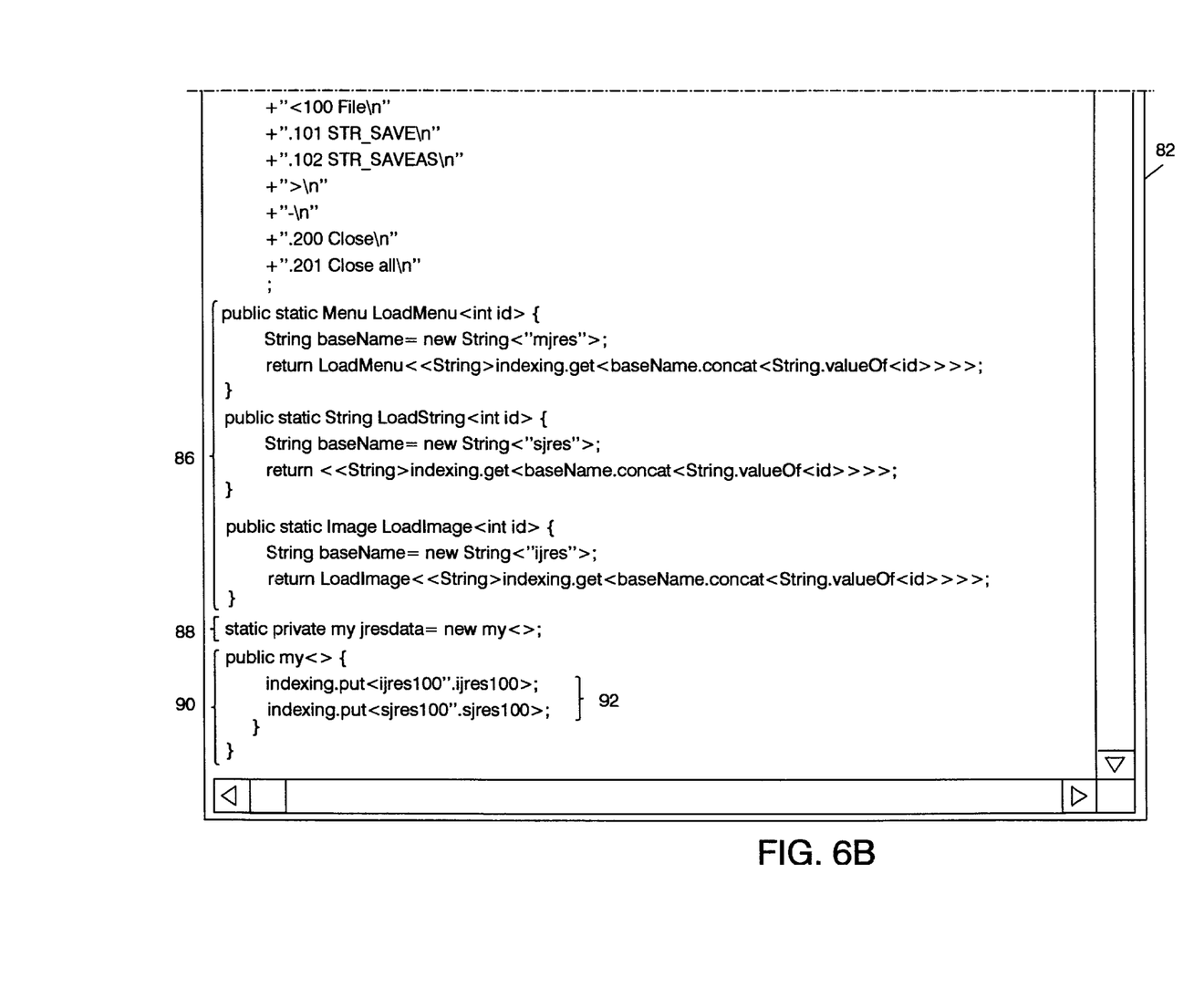

In the resource file 60 of FIG. 3, the package name is "tazza.resource". This name is converted into a Java language name (Step 112). FIG. 6 illustrates Java source code file 80 displayed in a window 82. The file 80 is the converted resource file 60 of FIG. 3 following conversion by the code converter 70. The first line of the Java source code file 80, "package tazza.resource;" is the Java equivalent of the package name. If no keyword "PackageName" is present in the resource file or upon completion of the conversion of the package name, processing proceeds to Step 114, in which the resource file code converter 70 writes required Java language prologue source code to the Java file being created. A prologue 84 is included in the Java file 80 of FIG. 6. The prologue code 84 imports elements of the Java language and programming environment that are necessary for the execution of the class that is being created. This prologue information for Java classes is known to skilled programmers.

The resource file code converter 70 then continues reading the resource file (Step 116) until the next keyword is found and read (Steps 118, 120). As discussed, a resource file is essentially a set of data items, each type of data item having an associated keyword to specify the type of data item.

Figure 7A:
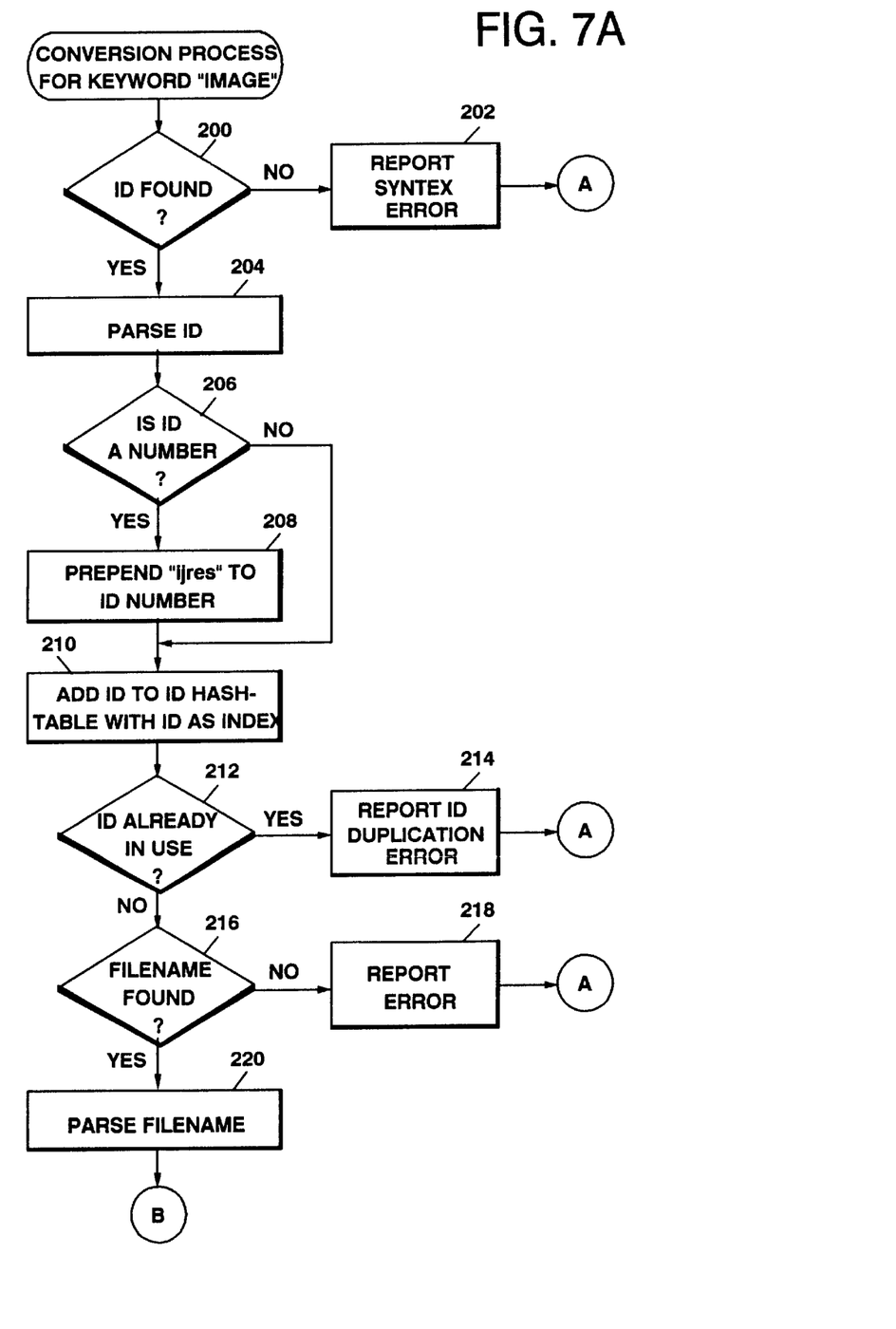
FIGS. 7A and 7B are flowcharts for converting data associated with the keyword "image" into Java source code.
Figure 7B:
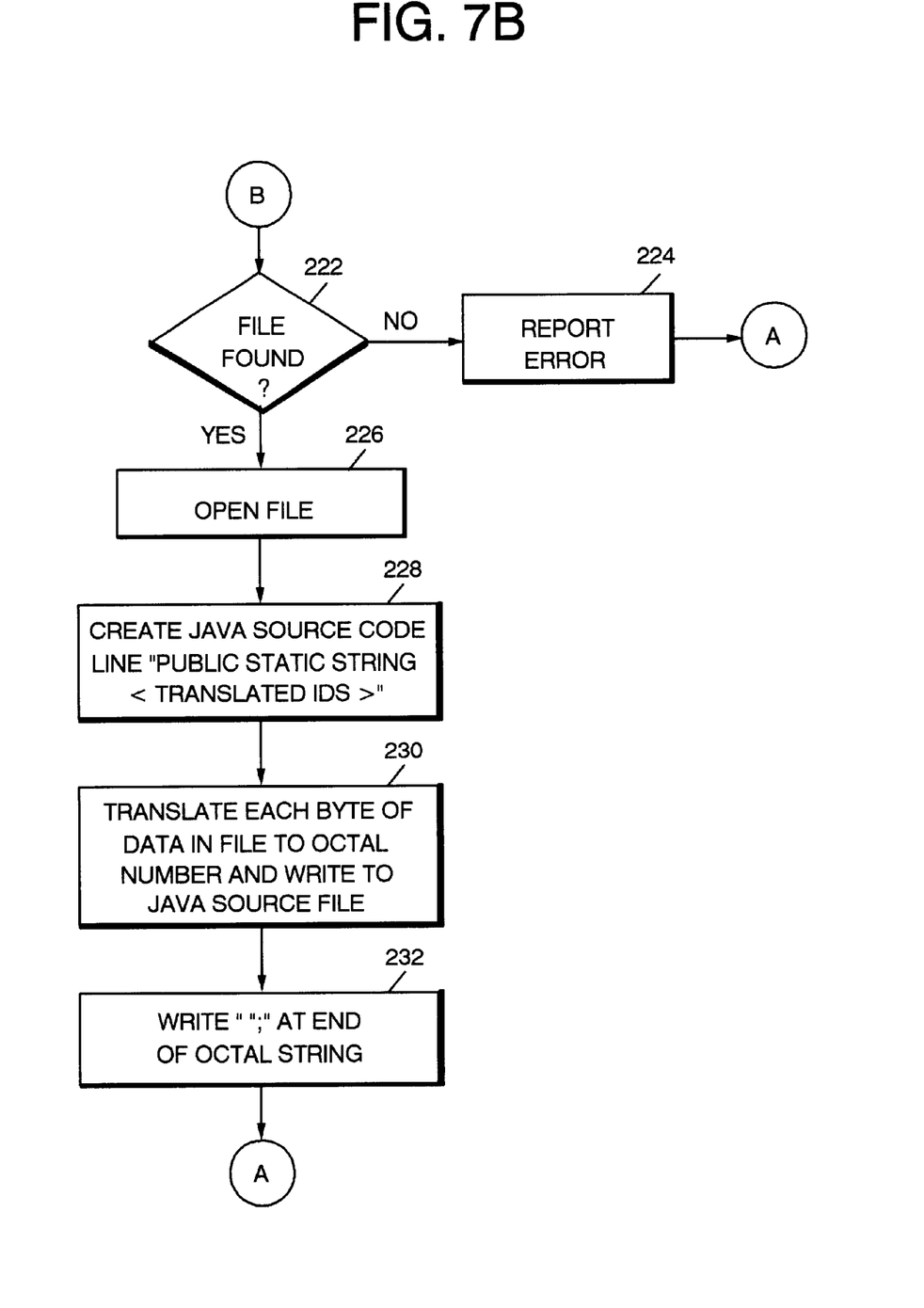

The number of different keywords that may be defined is limited only by the number of different types of data items or resources available, with additional resources being added over time. The keyword name for the same type of data item may be different in differently formatted resource files (such as a Windows resource file as opposed to an AIX resource file). A keyword may indicate that its associated data or data file is a menu for a graphical user interface, an animation clip, a sound clip, a data string, a bit map, etc. In general, the resource file code converter 70 will include a processing module for processing each type of different keyword that it may encounter. The general processing for converting a keyword and its associated data into the Java language is generally discussed below with respect to Steps 122–132. Additionally, specific processing relative to two different keywords is described relative to the flowcharts of FIGS. 7 and 8. Skilled programmers should be able to convert keywords and their associated data into Java language source code using the general technique described relative to Steps 122–150. The specific keyword processes described relative to the two keywords provides an outline which can be followed by a skilled programmer.

In Step 120, the resource file code converter 70 begins to process the data associated with the keyword which has just been read. Depending on the keyword, an ID may be associated with the keyword. If so, the ID converter 70 searches for the ID (Step 122). If the necessary ID is not found, an error is reported to the developer (Step 124) and processing for this keyword ends. Overall processing returns to Step 118 for processing the next keyword. If an ID is found in Step 122, the ID is then processed as per specific requirements for the keyword (Step 126). Once again, if necessary relative to the keyword being processed, the ID is then translated as required (Steps 128, 130). In Step 132, processing is completed relative to the keyword data to convert the remaining data and information associated with the keyword into Java language source code.

Following Step 132 and the processing of the rest of the data or information associated with the keyword being processed, processing returns to Step 118, in which it is determined if any additional keywords exist within the resource file. If so, the next keyword and its information or data are processed in accordance with the Steps 120–132. If no further keywords exist in the resource file, processing proceeds to Step 134, in which the resource file code converter 70 creates a Java source code epilogue portion 86 for the Java source file (Step 134). As is known in the art, epilogue code is required for a Java class. The epilogue code portion 86 of FIG. 6 shows epilogue code which is appropriate for the Java class being created. However, those skilled in the art could enable the appropriate epilogue code to be produced depending upon the nature of the resource file itself without undo experimentation.

Processing then proceeds to Step 136, in which private data from the resource file is converted into Java source code, of which Java source code 88 in FIG. 6 is an example. In Step 136, the resource file name (which is "my" in the source code line 88) is written as Java source code as follows:

"static private {resource file name} jsresdata=new {resource file name} ( );".

This serves to identify the resource file for the developer.

In Step 138, the constructer for the Java resource class is written together with code for initializing a hashtable for finding resources identified by numerical ID instead of alphanumeric ID. This source code is identified as code portion 90 in the Java source code file 80 of FIG. 6. This information identifies the class and initializes the Java hashtable function in which some of the data required by the resource file/Java class is maintained, such that when the Java class is executed, the Java execution environment will find the appropriate data using the hashtable function. Once again, the use of hashtables and utilizing hashtables to access data are known in the Java language and to Java programmers.

With the completion of Step 138, the creation of the Java source code file 80 from the resource file has been completed. As per Step 140, this Java source code file 80 is input to a standard Java compiler 72 (FIG. 4) for compiling into a Java class, which may then be utilized like any other Java class, as it has all of the characteristics and features of a Java class.

The specific process for converting each possible keyword and its associated data into Java source code for the Java source code file 80 will be somewhat different for each keyword. Additionally, it is likely that new keywords for new types of data included in resource files will be created with the passage of time. Accordingly, the resource file code converter 70 will include a subprocess for each possible keyword which is applied to its corresponding keyword from the resource file to convert the keyword and its associated data into Java source code. It is anticipated that new subprocesses will be added to the resource file code converter 70 as new keywords are created. The general process for converting a keyword and its associated data into Java source code should be within the skill of a Java programmer. For exemplary purposes, the processes for converting data associated with the keywords "image" and "define" will now be discussed with reference to FIGS. 7 and 8.

FIG. 7 illustrates the process for converting information associated with the "image" keyword into Java source code. Relative to the keyword "image", the specific process takes the place of the generically described process described with respect to Steps 120–132 of FIG. 5B. Upon reading the keyword "image" in the resource file 60 in the Step 120, the subprocess for the keyword "image" from the resource file code converter 70 is initialized. Data associated with the keyword "image" should be in a specific and generally accepted format. Data files associated with "image" can be of a number of formats, such as GIF or jpeg. Accordingly, the "image" process will report an error if the format has been not followed in the creation of the resource file 60 or the format of an identified data file is not recognized. Accordingly, upon reading the keyword "image" in the resource file 60, the "image" process from the resource file code converter 70 first looks for an ID (Step 200). If an ID is not found, an error is reported to the developer in Step 202, and processing returns to Step 118 for the next keyword, as the data associated with this keyword "image" is not properly formatted and cannot be processed.

If an ID is found (such as the IDs "cancel" and "100" from the resource file 60), the ID is parsed (Step 204). During parsing, if it is determined that the ID is numeric in Step 206, the string "ijres" is prepended to the numeric ID in Step 208. If the ID is found not to be a number in Step 206, then the ID is not modified, and processing proceeds directly to Step 210. By turning a numeric ID into a alphanumeric string, this enables the string to be easily read from a hashtable and provides a mechanism by which the ID for the defined keywords can be easily and consistently identified. The ID (the converted ID if the ID was originally a number) is then added to the ID hashtable being created within Java (Step 210), utilizing the ID for indexing purposes to permit easy retrieval. A hashtable 92 is illustrated within the code portion 90 of the Java source code file 80 in FIG. 6. In the hashtable 92, the modified ID "ijres100" can be found. If it is found in Step 212 that the ID is already in use within the hashtable 92, then an error is reported to the developer (Step 214), and processing returns to Step 118 of FIG. 5B.

If the ID is determined to be unique in Step 212, processing continues, and the name of a file (which contains the actual image associated with the keyword) is sought in Step 216. If a filename is not found within the resource file 60, then this error is reported to the developer (Step 218). If the filename is found, the filename is parsed (Step 220). In Step 222, the resource code file converter 70 searches memory, storage, etc. for the file itself. If the file cannot be found, this error is reported to the developer in Step 224. If the file is found in Step 222, the file is opened (Step 226) and the data in the file is converted in the following manner to a format suitable for inclusion within a Java class. First, the "image" subprocess of the resource file code converter 70 creates the following Java source code line:

"public static String {translated id}=".

For the keyword "image" and ID 100 from the resource file 60, the resulting line of code reads:

"public static String ijres100=".

This line is found in the source code resource file 80 at the first line of code portion 94 (Step 228). Next, in Step 230, each byte from the file (for the keyword "image" and ID 100 from the resource file 60, this file is /tazza/tazza/resource/images/cut.gif) is translated to octal form, and is written into the Java source code file 80. This octal data format is found in the second and third lines of the code portion 94. Finally, the Java language indicator "";" is added at the end of the octal string (Step 232).

Figure 5B:
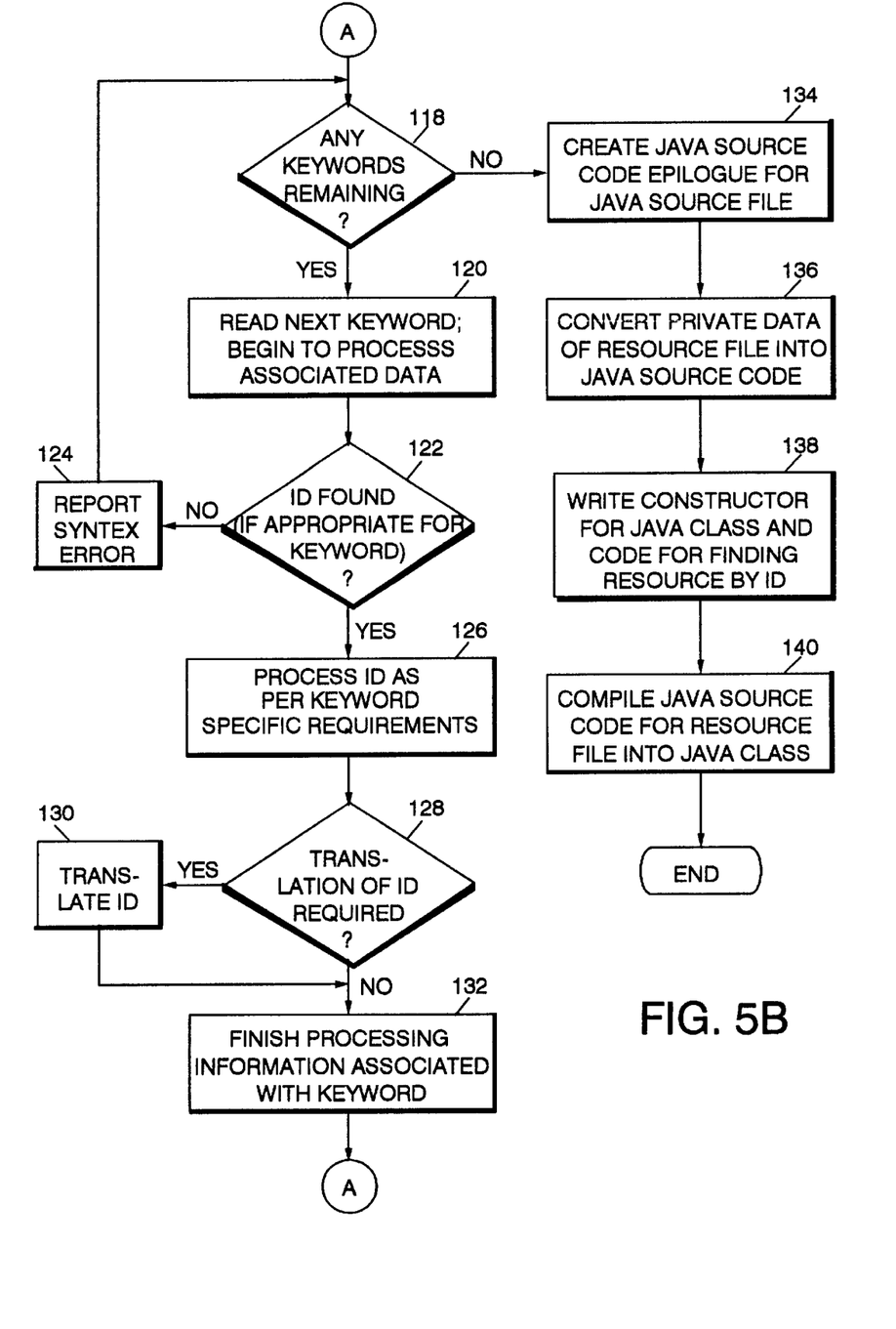

At this point, conversion of the data associated with an "image" keyword from the resource file 60 has been completed, and processing returns to Step 118 of FIG. 5B for the processing of any remaining keywords within the resource file 60.

Figure 8:
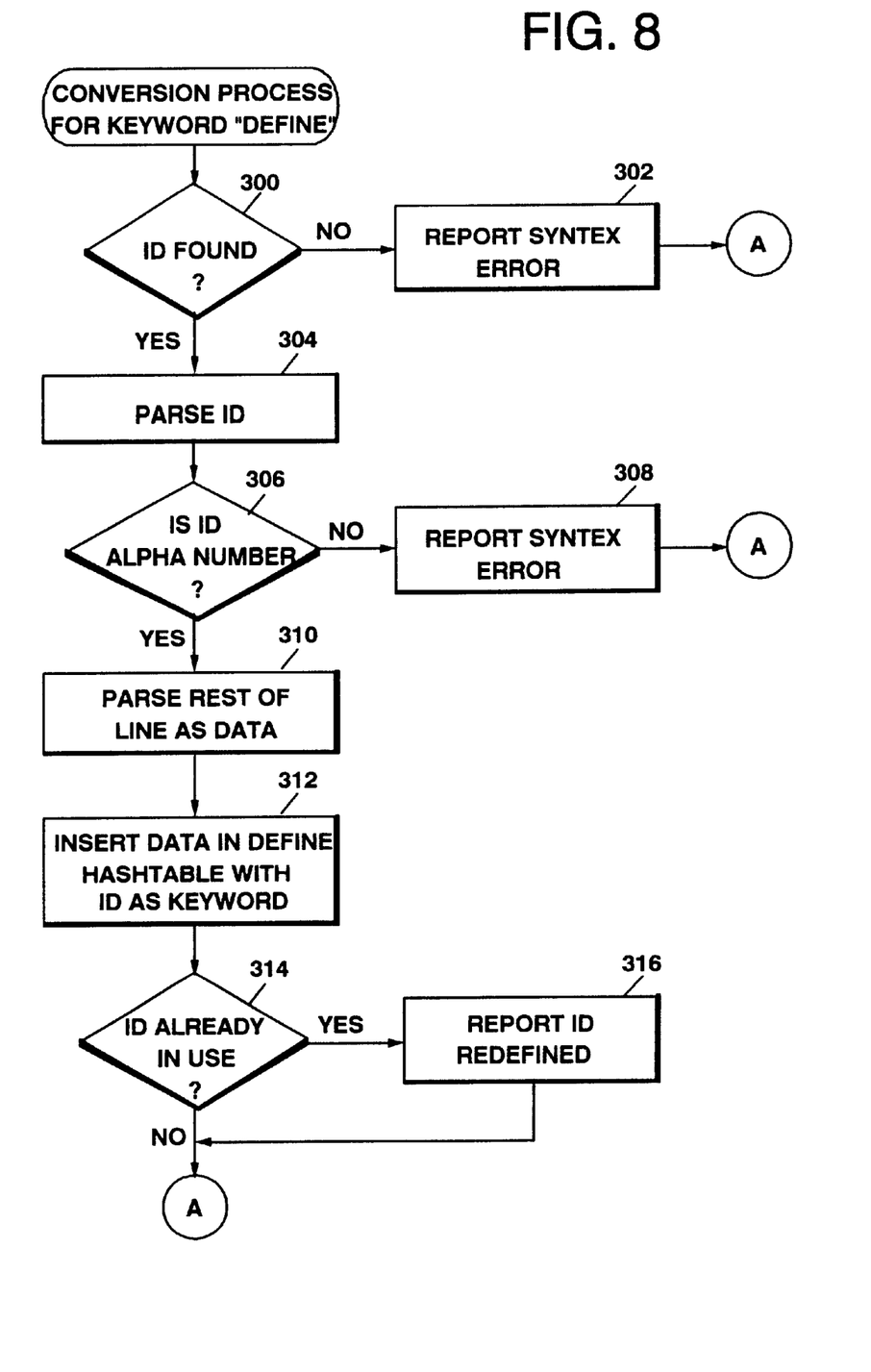
FIG. 8 illustrates a flowchart describing the logic for converting data associated with the keyword "define" into Java source code.

The conversion process for the keyword "define" is outlined in the flowchart of FIG. 8. This process starts out similarly to the process for the keyword "image". In Step 300, the process searches for the ID associated with the keyword. If the ID cannot be found, an error is reported to the developer (Step 302) and processing returns to Step 118. If the ID is found, the ID is parsed (Step 304) and it is determined whether the ID is alphanumeric (Step 306). If it is determined in Step 306 that the ID is not alphanumeric, this is an indication that something is wrong with the resource file. An error is reported to the developer (Step 308), and processing returns to Step 118 for the next keyword. If the ID is alphanumeric, the rest of the line of code associated with the keyword "define" is parsed as data (Step 310) and the data is added to a "define" hashtable with the ID being utilized as a keyword (Step 312). If it is found in Step 314 that the ID is already in use, this is indicative of an error, and the ID error is reported to the developer in Step 316. If the ID is determined to be unique in Step 314, then processing ends relative to this occurance of the "define" keyword within the resource file 60, and processing returns to Step 118 so that any remaining keywords can be processed.

After the code conversion process has been completed for a resource file, the resulting Java source code file is input to the standard Java compiler 72 for compiling into a compiled Java class.

Alternatively, the file can be left in source code form and compiled at a later time. This permits easier debugging and editing of the file, if either of these prove necessary or is desired. Also, the entire process may be performed in a single processing operation, such that the conversion process and compiling are seamless, and the intermediate source code file is ever actually output.

The resulting classes from the conversion process may be used like any other classes available to developers for developing applications in the Java language. These classes may be compressed in accordance with standard Java techniques for Java classes for sending over the Internet. This saves time by reducing the amount of time spent sending the application. No special support structure is required within the Java language to support resource files. Resource files may be utilized within class libraries and class packages, rather than being separate entities and elements that must be dealt with on their own special terms.

While the present invention has been described for converting resource files into Java classes, the basic techniques described here and may be applicable to many types of object oriented languages. Thus, while the preferred embodiment of the present invention has been described, additional variations and modifications in that embodiment may occur to those skilled in the art once they learn of the basic inventive concepts. Therefore, it is intended that the appended claim shall be construed to include both the preferred embodiment and all such variations and such modifications as fall within the spirit and scope of the invention.

What is claimed is:

1. Executable computer readable code stored on computer readable media for, when executed by a computer system, converting a resource file into object oriented source code for a target object oriented language, comprising:
   first subprocesses for converting a resource file filename to a class name acceptable by the target object oriented language;
   second subprocesses for converting information associated with each keyword into a format utilizable by a class in the target object oriented language; and
   third subprocesses for providing additional formatting code necessary for a class in the target object oriented language.

2. Computer readable code according to claim 1, further comprising a compiler for compiling output of said first, second, and third subprocesses.

3. Computer readable code according to claim 1, wherein the target object oriented language is Java.

4. A computer implemented process for converting a resource file into source code for a target object oriented language class, comprising:
   a plurality of subprocesses, one for each different keyword included the resource file, for converting data associated with the keyword into a form usable by a class in the target object oriented language;
   a first process for converting a resource filename into an acceptable class name;
   a second process for converting data associated with each keyword into code usable by the target object oriented language utilizing the subprocess corresponding to each keyword for each keyword in the resource file; and
   a third process for writing formal code required for a class in the object oriented language.

5. A computer implemented process according to claim 4, wherein the target object oriented language is Java.

6. A computer implemented process according to claim 5, wherein the formal code written by said third process includes Java epilogue code and Java constructor code.

7. A computer implemented process according to claim 5, further comprising a fourth process for compiling output of said first, second and third processes into a Java class.

8. In a computing environment, a computer based system for converting a resource file into object oriented source code for a target object oriented language, comprising:
   first means for converting a file name of a resource file being converted to a class name acceptable by the target object oriented language;
   second means for converting information associated with each keyword in the resource file into a format utilizable by a class in the target object oriented language; and
   third means for providing additional formatting code necessary for a class in the target object oriented language.

9. A system according to claim 8, further comprising means for compiling output from said first means, said second means and said third means.

* * * * *